United States Patent
Foley

(10) Patent No.: US 9,428,183 B2
(45) Date of Patent: Aug. 30, 2016

(54) SELF-EXPLAINING AUTONOMOUS VEHICLE

(71) Applicant: Toyota Motor Engineering & Manufacturing North America, Inc., Erlanger, KY (US)

(72) Inventor: James Peter Foley, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/448,559

(22) Filed: Jul. 31, 2014

(65) Prior Publication Data
US 2016/0031441 A1    Feb. 4, 2016

(51) Int. Cl.
| | |
|---|---|
| *B60W 30/00* | (2006.01) |
| *B60W 50/14* | (2012.01) |
| *B60W 50/00* | (2006.01) |
| *G05B 9/02* | (2006.01) |

(52) U.S. Cl.
CPC ............... *B60W 30/00* (2013.01); *G05B 9/02* (2013.01); *B60W 50/14* (2013.01); *B60W 2050/0072* (2013.01); *B60W 2050/143* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 5,469,356 | A | 11/1995 | Hawkins et al. | |
| 6,226,570 | B1* | 5/2001 | Hahn | B60K 28/066 701/1 |
| 7,783,426 | B2* | 8/2010 | Kato | B60W 40/04 180/167 |
| 8,078,349 | B1 | 12/2011 | Gomez et al. | |
| 8,433,470 | B1* | 4/2013 | Szybalski | 701/23 |
| 2003/0220722 | A1 | 11/2003 | Toba et al. | |
| 2010/0179715 | A1 | 7/2010 | Puddy et al. | |
| 2011/0118939 | A1* | 5/2011 | Kawamata | B60W 10/06 701/41 |
| 2011/0241862 | A1* | 10/2011 | Debouk | B60W 50/038 340/439 |
| 2013/0079991 | A1* | 3/2013 | Schmidt | B62D 6/00 701/42 |
| 2013/0131906 | A1 | 5/2013 | Green et al. | |
| 2013/0131907 | A1* | 5/2013 | Green | G05D 1/0055 701/23 |
| 2014/0095038 | A1* | 4/2014 | Breu | B60W 10/02 701/67 |
| 2014/0222277 | A1* | 8/2014 | Tsimhoni | B60W 30/00 701/23 |
| 2014/0324266 | A1* | 10/2014 | Zhu | G01W 1/00 701/23 |
| 2015/0015386 | A1* | 1/2015 | Langenhan | B60W 50/14 340/438 |
| 2015/0070160 | A1* | 3/2015 | Davidsson | B60W 50/14 340/457 |
| 2015/0094899 | A1* | 4/2015 | Hackenberg | B60W 50/082 701/23 |
| 2015/0211870 | A1* | 7/2015 | Nickolaou | G01C 21/34 701/28 |
| 2015/0283998 | A1* | 10/2015 | Lind | B60W 30/00 701/23 |
| 2015/0293216 | A1* | 10/2015 | O'Dea | B60W 30/12 701/23 |
| 2016/0026182 | A1* | 1/2016 | Boroditsky | H04L 67/306 701/23 |

FOREIGN PATENT DOCUMENTS

| | | |
|---|---|---|
| CA | 2739989 A1 | 4/2010 |
| WO | WO2013087514 A1 | 6/2013 |

* cited by examiner

*Primary Examiner* — Yonel Beaulieu
*Assistant Examiner* — Krishnan Ramesh
(74) *Attorney, Agent, or Firm* — Christopher G. Darrow; Darrow Mustafa PC

(57) ABSTRACT

A method for apprising a driver to a change in automation level of an automated self-drive system for a vehicle includes identifying an expected automation level change and communicating a required engagement level. The driver is thereby apprised of an appropriate level of engagement with each of a multiple of manual vehicle controls.

19 Claims, 4 Drawing Sheets

SELF-EXPLAINING AUTONOMOUS VEHICLE

BACKGROUND

The present disclosure relates to a vehicle, and more particularly to a self-explaining autonomous vehicle.

Automated vehicles are those in which at least some aspects of a safety-critical control function, e.g., steering, throttle, or braking, occur without direct driver input. Vehicles that provide safety warnings to drivers but do not perform a control function are, in this context, not considered automated, even though the technology necessary to provide that warning involves varying degrees of automation. Automated vehicles may use on-board sensors, cameras, GPS, and telecommunications to obtain information in order to make judgments regarding safety-critical situations and operate appropriately by effectuating control at some automation level.

Vehicle automation has been classified by the National Highway Traffic Safety Administration to range from no automation through full automation. Full automation performs all safety-critical driving functions and monitors roadway conditions for an entire trip and may need only that the driver provide destination or navigation input, but not control at any time during the trip. Such full automation includes both occupied and unoccupied autonomous vehicles.

The automated self-drive system typically conveys status information to a passenger in a variety of ways including illuminating elements of the vehicle. The location or color of the illumination may indicate the status of the automation. As vehicle automated systems become more sophisticated, however, it may become more difficult for the driver to readily understand system requirements.

SUMMARY

The automated self-drive system described herein can be used to instruct a driver as to a change in an automation level of the automated self-drive system. The automated self-drive system includes a required engagement level that provides specific instruction to the driver. The driver is thereby instructed to the appropriate level of engagement with each of a multiple of manual vehicle controls. A heightened alert status may also be triggered in response to non-compliance with the required engagement level until the driver complies.

A method for apprising a driver to a change in automation level of an automated self-drive system for a vehicle according to one disclosed non-limiting embodiment includes identifying an expected automation level change in an automated self-drive system for a vehicle. The automated self-drive system then communicates a required engagement level to the driver for the expected automation level change such that the driver is apprised of an appropriate level of engagement with each of a multiple of manual vehicle controls.

A method for apprising a driver to a change in automation level of an automated self-drive system for a vehicle according to another disclosed non-limiting embodiment includes identifying an expected automation level change in an automated self-drive system for a vehicle. The automated self-drive system then communicates a required engagement level to the driver for the expected automation level change such that the driver is apprised of an appropriate level of engagement with each of a multiple of manual vehicle controls. The automated self-drive system then confirms whether the driver has complied with the required engagement level and communicates the required engagement level to the driver at a heightened alert status in response to non-compliance until the driver complies.

An automated self-drive system for a vehicle according to one disclosed non-limiting embodiment includes a sensor system, a control system in communication with the sensor system, and a driver vehicle interface in communication with the control system. The system apprises a driver to a change in automation level of the automated self-drive system via a required engagement level such that the driver is apprised of an appropriate level of engagement with each of a multiple of manual vehicle controls.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting embodiments. The drawings that accompany the detailed description can be briefly described as follows.

DETAILED DESCRIPTION

An automated self-drive system for an automated vehicle is disclosed. The automated self-drive system specifically instructs the driver to the necessary level of manual control via a required engagement level. The required engagement level provides specific instruction to the driver so the driver is instructed in detail as to the appropriate level of engagement with each of a multiple of manual vehicle controls. The required engagement level specifically instructs the driver as to the driver's responsibility with respect to operation of the safety-critical control systems such as a braking system, a steering system, and a throttle system.

Figure 1:
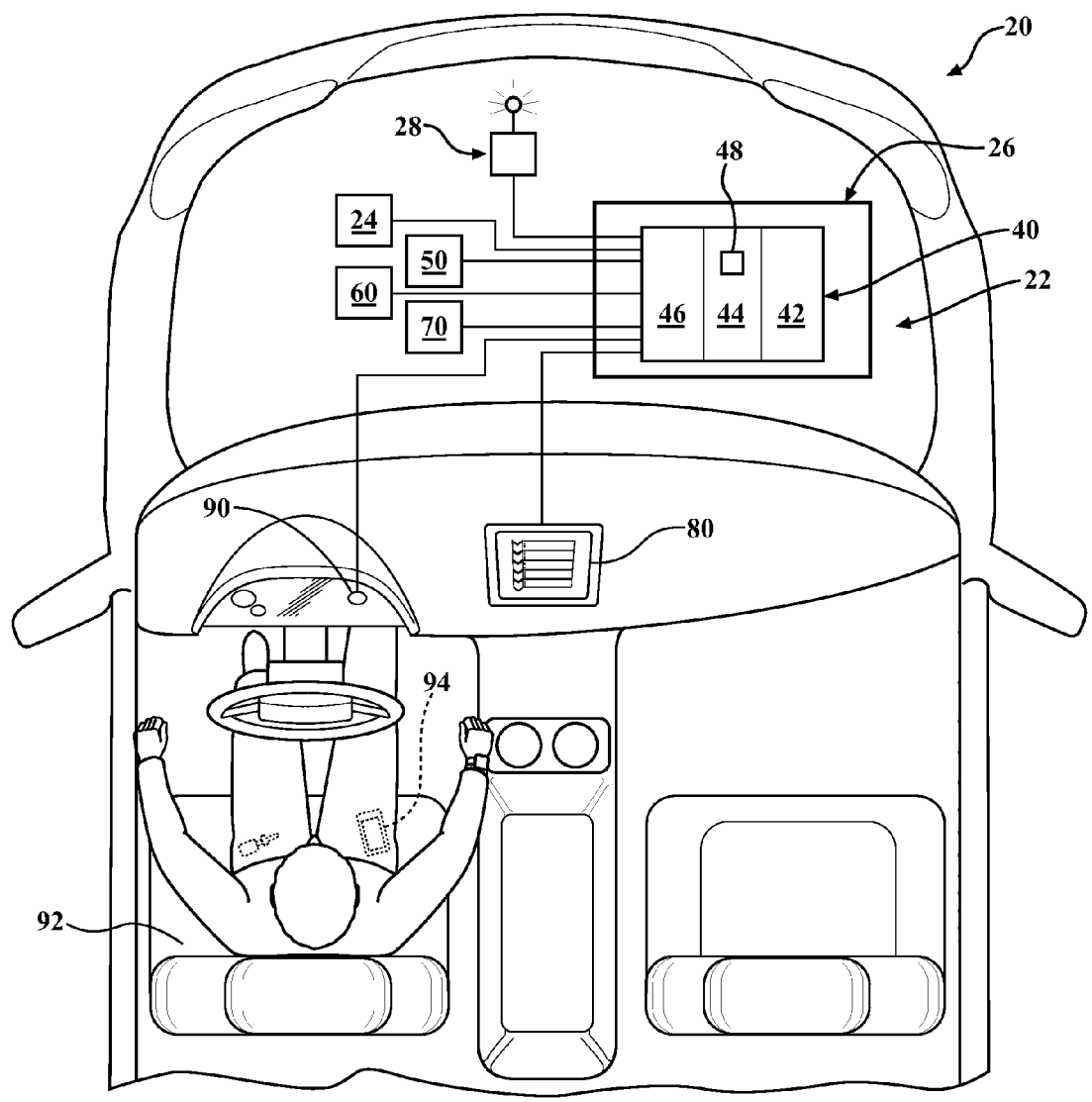
FIG. 1 is a schematic of an example vehicle for use with a method of apprising a driver to a change in automation level of an automated self-drive system for a vehicle.

FIG. 1 schematically illustrates a vehicle 20 with a self-drive system 22. The automated self-drive system 22 generally includes a sensor system 24, a control system 26 and a communication system 28. It should be appreciated that although particular systems are separately defined, each or any of the systems may be otherwise combined or segregated via hardware and/or software.

The sensor system 24 may include various sensors operable to identify a condition associated with and around the vehicle 20. In one disclosed, non-limiting embodiment, the sensor system 24 includes a surrounding monitor system that includes but is not limited to sensors such as imagery sensors, RADAR, SONAR, LIDAR and others. It should be appreciated that various sensors may alternatively or additionally be provided.

The control system 26 generally includes a control module 40 with a processor 42, a memory 44, and an interface 46. The control module 40 may be a portion of a central vehicle control, a stand-alone unit, or other system such as a cloud-based system. The processor 42 may be any type of microprocessor having desired performance characteristics, and the memory 44 may include any type of computer readable medium that stores the data and control algorithms 48 described herein. The interface 46 facilitates communication with other systems such as the sensor system 24, the communication system 28, and safety-critical control systems such as a braking system 50, a steering system 60, and a throttle system 70 to provide selective self-drive control of the vehicle 20 in response to the control algorithms 48.

The driver may interact with the control system 26 through a driver vehicle interface (DVI) 80. The DVI 80 may include an instrument panel with a touch screen, keypad, or other interface as well as a steering wheel, pedals, gear shifter, and/or other vehicle control interfaces. It should be appreciated that the vehicle control interfaces for the respective safety-critical control systems 50, 60, 70 are illustrated schematically and that various additional or alternative interfaces may be utilized to provide manual and self-drive operations of the vehicle 20.

Figure 2:
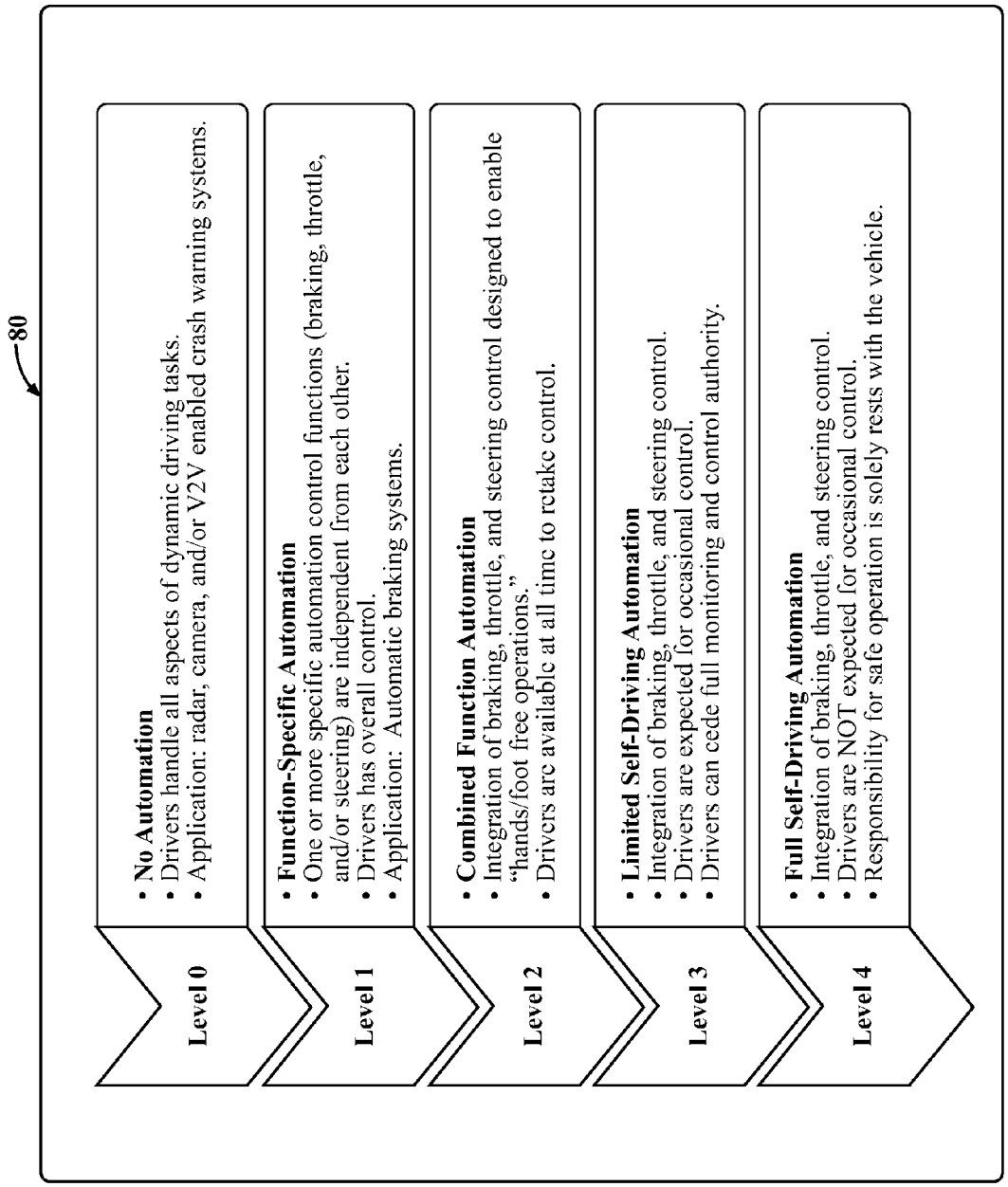
FIG. 2 is a display representation of example levels of automation.

The communication system 28 may be operable to receive information from off-board systems that provide information to the control algorithms 48 to include, but are not limited to, traffic information, weather information, location information and other such information that may facilitate control and navigation of the vehicle 20. The control algorithms 48 are operable to provide selective self-driving control of the vehicle 20 in accord with, for example, a range of vehicle automation that has been classified by the National Highway Traffic Safety Administration (NHTSA) from Automation Level 0 to Automation Level 4 (FIG. 2).

Automation Level 0—No Automation: The driver is in complete and sole control at all times of the primary vehicle controls and is solely responsible for monitoring the roadway and for safe operation. The primary vehicle controls are braking, steering, throttle. A vehicle with driver convenience systems that do not have control authority over steering, braking, or throttle would still be considered "Automation Level 0" vehicles. Examples of driver convenience systems include forward collision warning, lane departure warning, blind spot monitoring, and systems for automated secondary controls such as wipers, headlights, turn signals, hazard lights, etc.

Automation Level 1—Function-specific Automation: This Automation Level involves one or more specific control functions. If multiple functions are automated, they operate independently. The driver has overall control, and is solely responsible for safe operation, but can choose to cede limited authority over a primary control such as adaptive cruise control. Automated self-drive systems can provide added control in certain normal driving or crash-imminent situations e.g., dynamic brake support in emergencies. The vehicle may have multiple capabilities that combine individual driver support and crash avoidance technologies, but do not replace driver vigilance and do not assume driving responsibility from the driver. Automation Level 1 may assist or augment the driver, but there is no combination of systems that operate in unison to enable the driver to be disengaged from physically operating the vehicle by having hands off the steering wheel and feet off the pedals at the same time. Examples of function-specific automation systems include: cruise control, automatic braking, and lane keeping.

Automation Level 2—Combined Function Automation: This Automation Level involves automation of at least two primary control functions designed to work in unison to relieve the driver of control of those functions. Automation Level 2 can utilize shared authority when the driver cedes active primary control in certain limited driving situations. The driver is responsible for monitoring the roadway for safe operation and is expected to be available for control at all times and on short notice. This Automation Level can relinquish control with no advance warning and the driver must be ready to control the vehicle safely. An example of combined functions enabling Automation Level 2 is adaptive cruise control in combination with lane centering. The major distinction between Automation Level 1 and Automation Level 2 is that, at Automation Level 2 in the specific operating conditions for which the system is designed, the driver is disengaged from physically operating the vehicle with hands off the steering wheel and feet off the pedals at the same time.

Automation Level 3—Limited Self-Driving Automation: This Automation Level involves enables the driver to cede full control of all safety-critical functions under certain traffic or environmental conditions and in those conditions to rely heavily on the vehicle to monitor for changes in those conditions that would require transition back to driver control. The vehicle is designed to ensure safe operation during the automated driving mode and the driver is expected to be available for occasional control, but with a sufficiently comfortable transition time. An example would be an automated vehicle that can determine when the system is no longer able to support automation, such as from an oncoming construction area, and then signal to the driver to reengage in the driving task. The major distinction between Automation Level 2 and Automation Level 3 is that at Automation Level 3, the driver is not expected to constantly monitor the roadway.

Automation Level 4—Full Self-Driving Automation: This Automation Level involves performs all safety-critical driving functions and monitors roadway conditions for an entire trip. Such a design anticipates that the driver will provide destination or navigation input, but is not expected to be available for control at any time during the trip. Automation Level 4 permits occupied and unoccupied vehicles as safe operation rests solely on the automated vehicle system.

It should be appreciated that although four NHTSA automation levels are utilized for descriptive purposes herein, other delineations may additionally or alternatively provided. However, the complexity of even these four presently classified NHTSA automation levels may result in an unclear demarcation of operating boundaries and driver interaction responsibilities.

Figure 3:
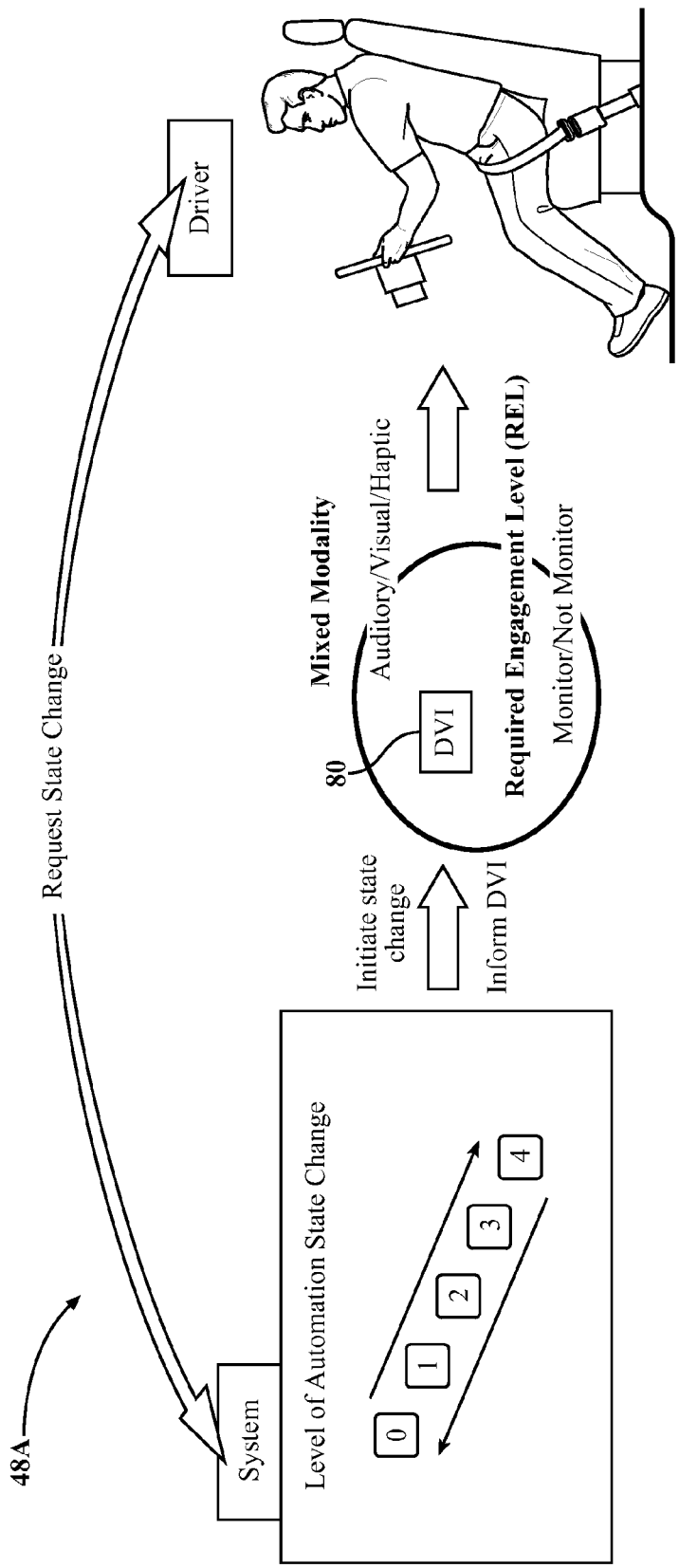
FIG. 3 is a schematic view of a method for apprising a driver to a change in automation level of an automated self-drive system for a vehicle.

With reference to FIG. 3, an algorithm 48A for driver interaction with the automated self-drive system 22 is schematically illustrated. The functions of the algorithm 48A are disclosed in terms of functional block diagrams in FIG. 4, and it should be appreciated that these functions may be enacted in either dedicated hardware circuitry or programmed software routines as a computer readable storage medium capable of execution as instructions in a microprocessor based electronics control embodiment such as the control system 26.

Figure 4:
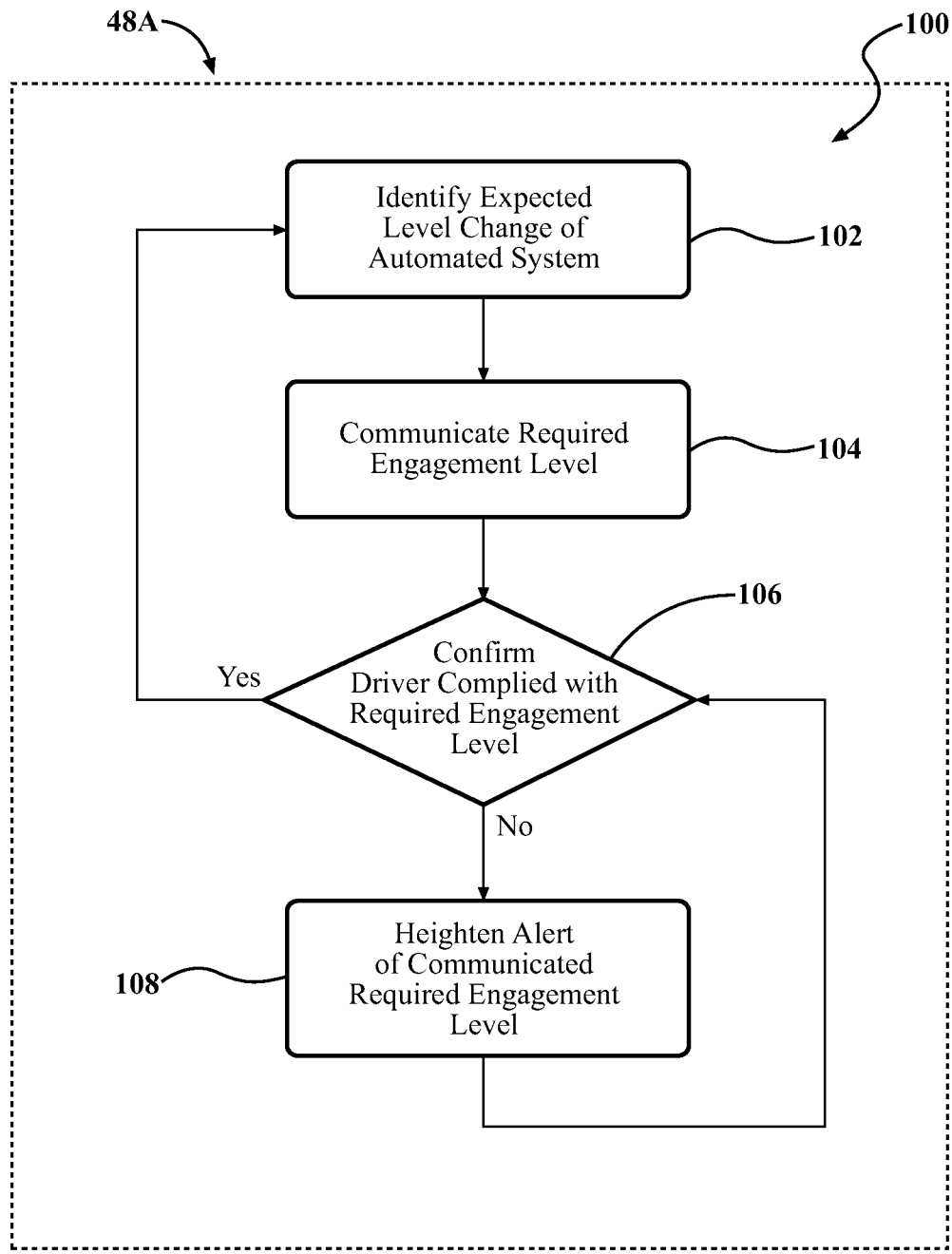
FIG. 4 is a flow chart illustrating the method for apprising a driver to a change in automation level of an automated self-drive system for a vehicle according to one disclosed, non-limiting embodiment.

With reference to FIG. 4, the algorithm 48A provides a method 100 for apprising the driver to a change in automation level of the automated self-drive system 22. The method 100 may be alternatively referred to as a Self-Explaining Car (SEC). The automated self-drive system 22 communicates a required engagement level (REL) so that the driver is specifically instructed as to the appropriate level of engagement with the manual vehicle controls.

The algorithm 48A for driver interaction with the automated self-drive system 22 initially identifies an expected automation level change (step 102). Next, the REL for the automation level change is communicated to the driver (step 104). That is, upon any change or upcoming change in automation level (step 102), REL details driver responsibilities through the DVI 80 in an audio, visual, and/or haptic communication (step 104).

The REL includes communication of that which is expected of the driver upon the upcoming change in automation level. For example, "Vehicle Will Change From automation level 3 To automation level 2 In Thirty Seconds—Driver To Resume Authority For Steering, Braking, and Throttle Control". It should be appreciated that various time periods may be provided for a sufficiently comfortable driver transition time. The driver transition time may also be associated with the automation level change, as some automation level changes in response to an upcoming road condition may require more immediate attention, e.g., "CONSTRUCTION APPROACHING—Driver To Resume Authority For Steering, Braking, and Throttle Control." Further, the changes in automation level do not have to be sequential and direct changes to nonadjacent automation levels may be provided. Either the driver or the automated self-drive system 22 can initiate the automation level change.

Communication of the REL may include auditory, visual, and/or haptic communication as well as combinations thereof. For example, the DVI 80 may display the REL such as that in FIG. 2, in combination with an audio announcement thereof.

Optionally, the driver sensor system 90 confirms if the required engagement level (REL) has been achieved (step 106), and, if the REL has not been achieved, the REL for the automation level change is communicated to the driver at a heightened alert status such as via a haptic communication (step 108). The haptic communication may thereafter continue until the REL has been achieved. For example, a driver sensor 90 (FIG. 1) operable to confirm driver engagement with the steering wheel and the pedals after the audio and visual REL has been presented, may be utilized to trigger the haptic alert (step 108). Should the driver not respond in the desired manner (step 106), a haptic alert that vibrates a vehicle seat 92 (FIG. 1) or personal electronic device 94 (FIG. 1) of the driver may be utilized to further gain the attention of the driver (step 108).

The use of the terms "a," "an," "the," and similar references in the context of description are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A computer storage medium having embodied thereon non-transitory computer-readable instructions that, when executed, perform a method for apprising a driver to an expected automation level change in an automated self-drive system for a vehicle, the method comprising:

identifying, in a vehicle having a multiple of manual vehicle controls, but subject to control under an automated self-drive system according to a plurality of automation levels with mutually distinct sets of driver's responsibilities for operating the multiple of manual vehicle controls, an expected automation level change from a current automation level to an upcoming automation level; and communicating, with a driver vehicle interface in the vehicle, a required engagement level for the expected automation level change to a driver, the communication including a specific instruction as to all of the driver's new responsibilities for operating the multiple of manual vehicle controls from the set of driver's responsibilities for operating the multiple of manual vehicle controls for the current automation level to that for the upcoming automation level upon the expected automation level change.

2. The method as recited in claim 1, further comprising confirming whether the driver has complied with the required engagement level.

3. The method as recited in claim 2, further comprising communicating the required engagement level to the driver at a heightened alert status in response to non-compliance with the required engagement level.

4. The method as recited in claim 3, wherein the heightened alert status includes a haptic alert.

5. The method as recited in claim 4, further comprising continuing the haptic alert until the driver has complied with the required engagement level.

6. The method as recited in claim 2, further comprising communicating the required engagement level to the driver at a heightened alert status in response to non-compliance with the required engagement level until the driver complies.

7. The method as recited in claim 1, wherein the multiple of manual vehicle controls includes a braking system, a steering system, and a throttle system.

8. The method as recited in claim 1, wherein communicating the required engagement level to the driver includes audio communication.

9. The method as recited in claim 1, wherein communicating the required engagement level to the driver includes visual communication.

10. The method as recited in claim 1, wherein the multiple of manual vehicle controls includes a braking system, and a steering system.

11. A vehicle, comprising:
a multiple of manual vehicle controls;
an automated self-drive system under which the vehicle is controlled according to a plurality of automation levels with mutually distinct sets of driver's responsibilities for operating the multiple of manual vehicle controls;
a control system for identifying an expected automation level change from a current automation level to an upcoming automation level; and
a driver vehicle interface in communication with the control system for communicating a required engagement level for the expected automation level change to a driver, the communication including a specific instruction as to all of the driver's new responsibilities for operating the multiple of manual vehicle controls from the set of driver's responsibilities for operating the multiple of manual vehicle controls for the current automation level to that for the upcoming automation level upon the expected automation level change.

12. The vehicle as recited in claim 11, further comprising a driver sensor that confirms if the required engagement level has been complied with.

13. The vehicle as recited in claim 12, wherein the required engagement level is communicated to the driver at a heightened alert status in response to non-compliance with the required engagement level.

14. The vehicle as recited in claim 13, wherein the heightened alert status includes a haptic alert.

15. The vehicle as recited in claim 14, wherein the haptic alert is continued until the driver has complied with the required engagement level.

16. The vehicle as recited in claim 11, wherein the driver vehicle interface visually communicates the required engagement level to the driver.

17. The vehicle as recited in claim 11, wherein the multiple of manual vehicle controls includes a braking system, a steering system, and a throttle system.

18. The vehicle as recited in claim 11, wherein the driver vehicle interface audibly communicates the required engagement level to the driver.

19. The vehicle as recited in claim 11, wherein the required engagement level is communicated to the driver at a heightened alert status in response to non-compliance with the required engagement level until the driver complies.

* * * * *